Figure 4:
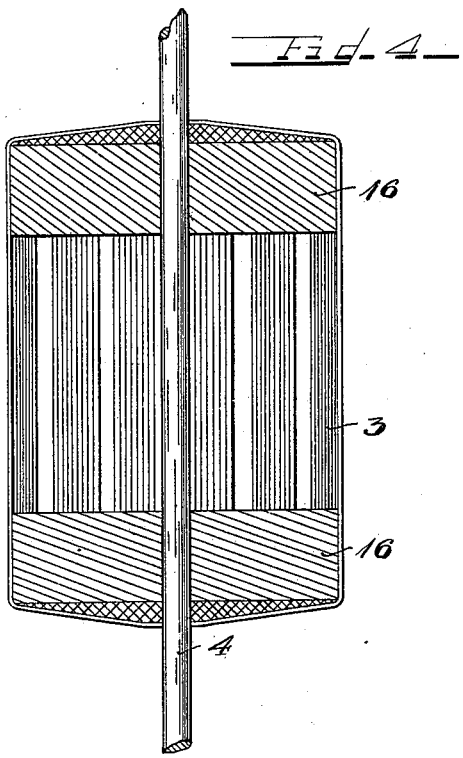

No. 698,689. Patented Apr. 29, 1902.
T. DUNCAN.
ELECTRICAL MEASURING INSTRUMENT.
(Application filed Mar. 8, 1900.)
(No Model.) 3 Sheets—Sheet 1.
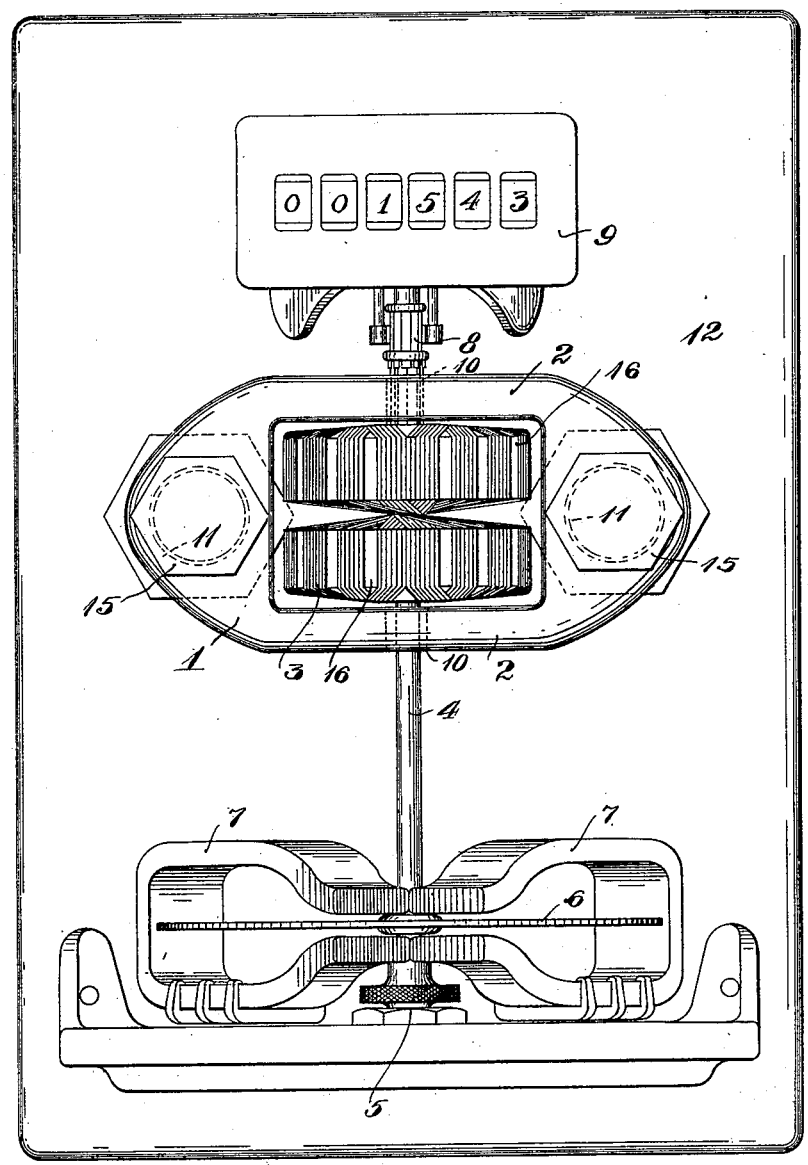

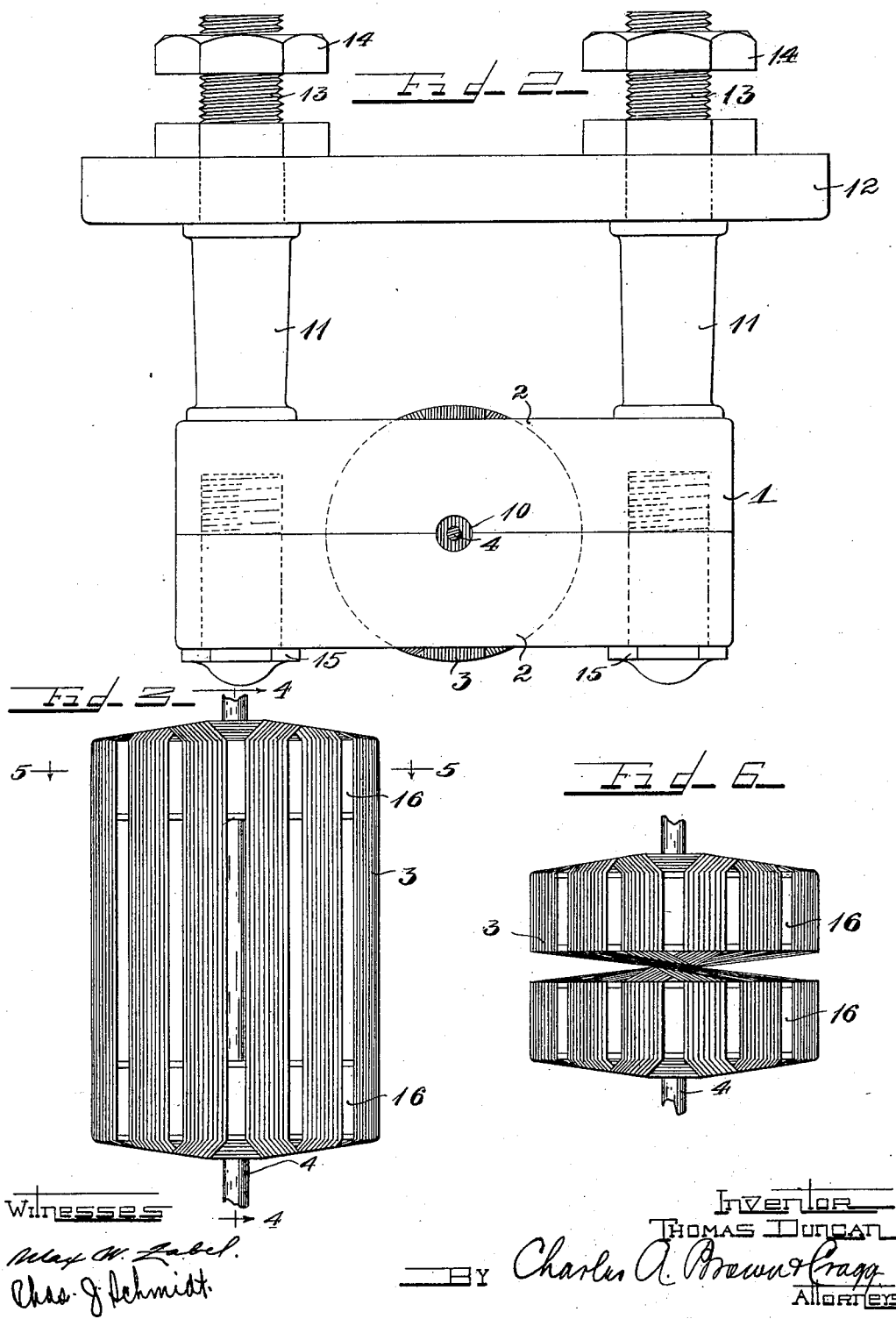

No. 698,689. Patented Apr. 29, 1902.
T. DUNCAN.
ELECTRICAL MEASURING INSTRUMENT.
(Application filed Mar. 8, 1900.)

(No Model.) 3 Sheets—Sheet 3.

Witnesses
Max W. Zabel.
Chas. J. Schmidt.

Inventor
Thomas Duncan
By Charles A. Brown & Cragg
Attorneys

THE NORRIS PETERS CO., PHOTO-LITHO., WASHINGTON, D. C.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,689, dated April 29, 1902.

Application filed March 8, 1900. Serial No. 7,803. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 359,) of which the following is a full, clear, concise, and exact description, reference being had to the accompanying drawings, forming a part of this specification.

My invention relates to electric meters, and has for its object the provision of an improved form of armature provided with windings to which current is supplied and the construction of an improved field portion for the armature.

One of the features of my invention relates more particularly to meters having enlarged and rigid field-conductors of such size as to inclose a very large portion of the armature, the field-conductor replacing the field-windings commonly used and comprised of a number of turns of wire. In this class of meters, to which one feature of my invention relates, a bore or passage is provided through the same, the spindle of the meter-armature passing through the bore. Such construction is illustrated, for example, in my application, Serial No. 84, filed January 2, 1900. In the construction disclosed in the said copending application it is somewhat difficult to repair the meter and to permit access to the armature, which is inclosed by the field-conductor. In accordance with my invention I construct that portion of the field-conductor where the said bore or passage is located that receives the spindle in separable sections, which when separated permit access to the armature and spindle, so that the meter may be readily repaired, this construction also permitting the parts of the meter to be more readily removable. The meeting edges or faces of the separable sections lie, preferably, in a plane passing through the said passage and preferably coincident with the axis of the bore and the armature-spindle passing through the same.

The other feature of my invention is designed, primarily, for meters which employ duplicated armature portions; and it consists, generally speaking, in an improved construction of armatures whereby the same may be formed in duplicated portions without the necessity of winding each portion separately.

Broadly speaking, my invention consists in an armature whose turns of wire are laterally displaced—that is, these turns extend longitudinally of the armature in one direction throughout a portion of the length of the armature and are then laterally deflected and continued throughout the remaining portion of the length of the armature. This feature of my invention is especially applicable to the type of meter disclosed in my said copending application, as I am enabled to form the equivalent of the duplicated armature therein disclosed by a single construction. In practicing this feature of my invention in connection with the meter of my said copending application I preferably displace the armature-turns one hundred and eighty degrees with respect to each other—that is, the armature-turns extend longitudinally of the armature in one direction throughout a portion of its length and are then laterally deflected one hundred and eighty degrees and continued throughout the remainder of the length of the armature.

I will explain my invention more fully by reference to the accompanying drawings, illustrating the preferred embodiment thereof, in which—

Figure 5:
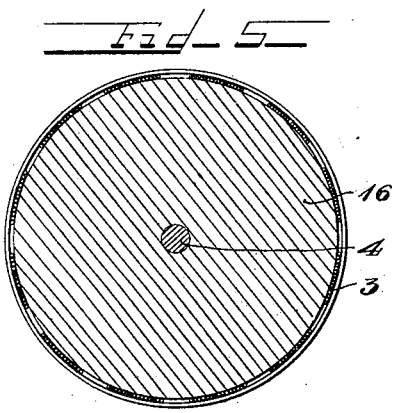

Figure 1 is a front elevation showing a meter embodying the features of my invention. Fig. 2 is a plan view of parts of the construction shown in Fig. 1. Fig. 3 is an elevation of an armature that has been partially constructed. Fig. 4 is a sectional view on line 4 4 of Fig. 3. Fig. 5 is a sectional view on line 5 5 of Fig. 3. Fig. 6 illustrates the completed armature of my invention.

Like parts are indicated by similar characters of reference throughout the different figures.

The series winding or conductor 1 is adapted for inclusion in series with one of the main conductors of the system, this current-conductor being provided with parallel paths 2 2, between which the armature 3 is placed. A spindle 4 is provided for rotatably supporting the armature, this spindle being rotably mounted at its lower end upon a jewel bearing 5 and suitably journaled at its upper end. A retarding device comprising a disk 6, fixed upon the spindle and permanent magnet 7, is shown. A commutator 8, mounted in this instance at the upper end of the spindle, is provided for conveying current to the armature. A counting device 9 is shown actuated by the armature-spindle for recording the measurements of the meter. The series or current field-conductor shown has an interior rectangular contour, the armature being disposed within the space inclosed by the said conductor. A vertically-disposed passage 10 is provided through the central portion of the field-conductor, this passage penetrating the opposite horizontal parallel branches of the said conductor. Two metallic terminal posts 11 11 are provided for supporting the current-conductor 1, which point is midway between the horizontal sides 2 2, the terminal posts being preferably supported upon a vertical back piece 12, composed of marble or other suitable material. Threaded stems 13 of the posts are provided, these stems extending through the back piece to the rear thereof. Nuts 14 are screwed upon the said threaded stems for the purpose of connecting the terminals of the main conductor with said posts. The posts and the field-conductor supported thereby are preferably formed of copper.

The field or current conductor is formed in separable sections, the said conductor being preferably divided to divide the same into two equal parts, that are separably secured together by means of copper bolts 15 15, placed, preferably, in alinement with the posts 11 11. If it should be desired to gain access more readily to the armature, the forward section of the field-conductor may be removed by unscrewing the bolts 15. By this construction the parts may be readily assembled and disassembled.

The armature that I have devised for use in connection with the type of meter herein shown is preferably formed by winding the wire composing the same over separated heads 16 16, mounted upon the spindle and capable of longitudinal movement toward each other and rotation with relation to each other. One of the core-heads of the armature is preferably fixed, while the other is capable of the required longitudinal and rotary movements. The armature is first wound as such armatures usually are, after which the movable core-head is rotated, in this instance through an angle of one hundred and eighty degrees, whereby those portions of the turns of the armature previously extending parallel with relation to the armature-spindle are deflected at the intermediate portion of their lengths, whereby each armature-turn extends a short distance longitudinally of and parallel to the armature-spindle at one core-head, is then deflected one hundred and eighty degrees, and continued parallel with the armature-spindle at the other core-head. The armature as thus constructed is the equivalent in electrical functions of the armature disclosed in my aforesaid copending application, but is greatly improved and simplified in mechanical construction. I do not wish, however, to be limited to the precise use to which the armature of my present invention may be put.

Changes may be readily made from the preferred embodiment of my invention herein shown and particularly described, and I do not, therefore, wish to be limited to the precise disclosure of the invention herein set forth; but,

Having thus described my invention, I claim as new and desire to secure by Letters Patent—

1. The combination with an armature provided with core-heads relatively rotatable and movable longitudinally with relation to each other, of armature-wire disposed about the said core-heads, electrically-continuous portions of the armature-winding at the core-heads being displaced laterally, substantially as described.

2. The combination with an armature provided with core-heads relatively rotatable and movable longitudinally with relation to each other, of an armature-wire disposed about the said core-heads, electrically-continuous portions of the armature-winding at the core-heads being displaced laterally, substantially one hundred and eighty degrees, substantially as described.

3. The combination with an armature provided with core-heads relatively rotatable and movable longitudinally with relation to each other, of armature-wire disposed about the said core-heads, electrically-continuous portions of the armature-winding at the core-heads being displaced laterally, substantially one hundred and eighty degrees, and a commutator for conveying current to the armature, substantially as described.

4. The combination with an armature-winding, of a mounting therefor, permitting relative rotation between the ends of said winding, substantially as described.

5. The combination with an armature-winding, of a mounting therefor permitting relative longitudinal movement of the ends of the armature-winding, substantially as described.

6. The combination with an armature-winding, of a mounting therefor, permitting relative rotation between portions of said winding, substantially as described.

In witness whereof I hereunto subscribe my name this 3d day of March, A. D. 1900.

THOMAS DUNCAN.

Witnesses:
 MAX W. ZABEL,
 CHARLES E. HUBERT.